(12) United States Patent
Kupwade Patil et al.

(10) Patent No.: US 11,538,318 B2
(45) Date of Patent: *Dec. 27, 2022

(54) SECURITY APPARATUS AND CONTROL METHOD THEREOF

(71) Applicant: LG Electronics, Inc., Seoul (KR)

(72) Inventors: Harsh Kupwade Patil, Fremont, CA (US); Mohamed Elfataoui, San Jose, CA (US)

(73) Assignee: LG Electronics, Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/938,566

(22) Filed: Jul. 24, 2020

(65) Prior Publication Data

US 2020/0357251 A1 Nov. 12, 2020

Related U.S. Application Data

(63) Continuation of application No. 16/098,833, filed as application No. PCT/KR2017/004679 on May 2, 2017, now Pat. No. 10,726,692.

(Continued)

(51) Int. Cl.
*G08B 13/196* (2006.01)
*H04N 5/77* (2006.01)
(Continued)

(52) U.S. Cl.
CPC ....... *G08B 13/19695* (2013.01); *G06F 21/32* (2013.01); *G06K 9/00* (2013.01);
(Continued)

(58) Field of Classification Search
CPC .... G08B 13/19695; H04N 7/183; H04N 7/18; H04N 5/77; G06F 21/32; G06K 9/46; G06K 9/00885; G06K 9/00
See application file for complete search history.

(56) References Cited

U.S. PATENT DOCUMENTS 10,726,692 B2 * 7/2020 Kupwade Patil .. G06K 9/00885
2013/0127591 A1 5/2013 Shay et al.
(Continued)

FOREIGN PATENT DOCUMENTS

KR 10-0893905 B1 4/2009
KR 10-2011-0137469 A 12/2011
(Continued)

OTHER PUBLICATIONS

International Search Report and Written Opinion—PCT/KR2017/004679—ISA/KR—Jul. 24, 2017.

*Primary Examiner* — Girumsew Wendmagegn
(74) *Attorney, Agent, or Firm* — Duane Morris LLP; Philip Woo

(57) ABSTRACT

In some embodiments, a security device comprises a context information intake device, a sensor, and a controller. The controller is configured to activate the context information intake device when the sensor detects an activation event initiated by an object such that the context information intake device records context information associated with the object; and perform a context-aware cryptographic process to cryptographically authenticate the object using attribute-based access control based on the recorded context information associated with the object.

18 Claims, 6 Drawing Sheets

Related U.S. Application Data

(60) Provisional application No. 62/331,985, filed on May 5, 2016.

(51) Int. Cl.
*H04N 7/18* (2006.01)
*G06K 9/00* (2022.01)
*G06V 10/40* (2022.01)
*G06V 40/10* (2022.01)
*G06F 21/32* (2013.01)

(52) U.S. Cl.
CPC .............. *G06V 10/40* (2022.01); *G06V 40/10* (2022.01); *H04N 5/77* (2013.01); *H04N 7/18* (2013.01); *H04N 7/183* (2013.01)

(56) References Cited

U.S. PATENT DOCUMENTS

2015/0227925 A1* 8/2015 Filler .................... G06T 1/0021
382/100
2017/0163847 A1 6/2017 Ogura

FOREIGN PATENT DOCUMENTS

| KR | 10-1407443 B1 | | 7/2014 |
| KR | 101407443 B1 | * | 7/2014 |
| KR | 10-2016-0026175 A | | 3/2016 |

* cited by examiner

FIG. 5
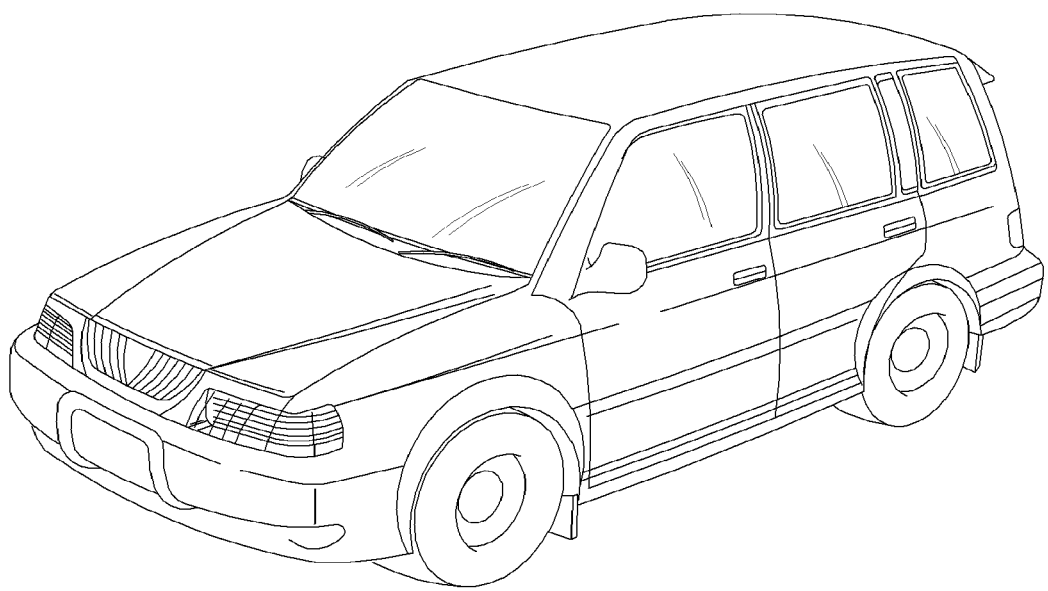
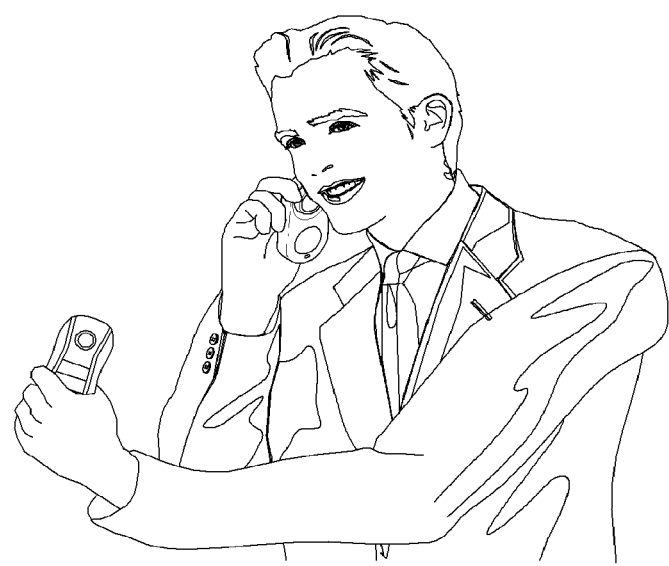

SECURITY APPARATUS AND CONTROL METHOD THEREOF

RELATED MATTERS

The present application is a continuation of U.S. patent application Ser. No. 16/098,833, filed on Feb. 25, 2019, which claims priority to International Patent Application No. PCT/KR2017/004679, filed on May 2, 2017, which claims priority to and the benefit of the filing date of U.S. Provisional Patent Application 62/331,985 filed on May 5, 2016, all of which are incorporated by reference herein in their entireties.

TECHNICAL FIELD

The present invention relates to a security device used in various devices and systems and control method thereof.

BACKGROUND ART

Recently, the influx of IoT devices has increased the need for security and personal information protection of devices and users of the devices. However, current security solutions are not scalable and difficult to protect against attacks on new routes. Therefore, to solve the problem of security and personal information protection, it is necessary to develop an overall security solution considering context information.

Prior to integrating navigation into security, we would like to introduce a human navigation method. The human navigation method in indoor and outdoor environments can ultimately reduce the estimate of distance and direction for one or several known reference points.

For example, when a person is driving a car, the person can device in a state of recognizing a distance and direction of another car in front, side, or rear, even if the person does not recognize all the distances and directions of the surrounding cars.

To this end, a user periodically estimates changes in displacement and orientation and adds the estimated displacement and direction to a distance and direction in relation to a reference point for calculating a user location and direction.

All positioning and navigation methods are based on a dead-reckoning or landmark-based exploration method. In this case, the dead-reckoning method, also known as path integration, is based on a single reference point throughout the exploration.

Here, dead-reckoning records and integrates changes in position or speed. To calculate the position, a new measurement value is added to the value of a previous position.

On the other hand, unlike dead-reckoning, a landmark-based exploration method known as position fixation is based on several identifiable reference points (landmarks). Here, a user mutually exchanges a space between the reference points while tracking a relative position of the landmark via navigation. This technology requires a physical or cognitive map for an environment.

Moreover, navigation and positioning systems can also be divided into three categories, i.e., a navigation system, a location system and an integrated navigation system.

The location system can estimate a location only. Yet, the navigation system can automatically estimate a speed and location. Moreover, the integrated navigation system known as a hybrid location system can estimate a location and speed using two or more technologies.

Since all navigation systems are basically capable of location measurements, a location measuring method may include dead-reckoning, direct-sensing, triangulation and pattern recognition, which can be realized by non-limited methods.

Namely, the location measuring method can be classified into dead-reckoning, direct-sensing, triangulation and pattern recognition. The aforementioned 4 kinds of technologies shall be described in the following.

Hereinafter, a term 'context' is a broad term, non-limited by location information and/or directions.

Hereinafter, position and location are interchangeable even if expressed differently. Position is expressed qualitatively while location is expressed quantitatively. In other words, positioning and localization can also be interpreted in the same manner as above.

Dead-Reckoning

Dead-reckoning determines and cumulatively calculates a user's location by measuring a location, a speed or changes of a location and speed. Here, the cumulative calculation is to calculate a current location in a manner that a change of a location value is combined with a previous location value. For example, a distance and speed can be respectively measured using a walk speedometer or an odometer.

Moreover, in case of an aviation or marine application, devices such as radars, sonars and cameras can be used. Here, azimuth, pitch and roll measurements can be obtained using at least one of an accelerometer, a gyroscope and a magnetometer. A quality of such a sensor may have a noticeable level difference in costs depending on an application. For example, in case of an aviation application, a cost of such a sensor is estimated as several thousand dollars. Yet, in case of a mobile application, a cost amounts to 1 dollar or less only. Moreover, a complete 3D dead-reckoning navigation system is Inertial Navigation System (INS).

Dead-reckoning has two disadvantages different from those of INS. The first disadvantage is that location should be frequently reset using GPS, radio frequencies and the like. Second, due to the recursive nature of the dead-reckoning location, errors tend to accumulate over time. On the other hand, dead-reckoning also has many advantages, including reduced installation costs, continuous operation and the like.

Direct Detection

A location measurement method based on direct detection estimates a location by accessing a close equation of an identifier or tag installed in the environment. As a result, when a signal is received, a receiver location is assumed to be a transmitter location. That is, if a user tag gets closer to a landmark, a landmark location is assumed as a user's location.

Moreover, information on a location and user may be saved to a tag itself or found from a database. Here, database information may be located in a user device in advance or use a landmark database created by a navigation system using a technique called Simultaneous Localization And Mapping (SLAM).

Moreover, environment characteristics can be measured using other sensors such as a camera, a laser scanner, a radar, a sonar and the like. In this case, user direction estimation is computed by consecutive tag detections according to relative location changes.

A tag used for identification is based on 5 techniques, i.e., Radio Frequency Identification (RFID), Bluetooth Beacon, barcode, Infrared Ray (IR), and Ultrasound Identification (USID).

Direct detection has an advantage that location measurement can be performed quickly and accurately with low costs but disadvantages such as installation costs of a transmitter, a short range (cf. a wide range requires more power), and interference from natural lights, artificial illumination and the like.

Triangulation

Navigation techniques based on triangular measurements require at least three known reference points to estimate a user location. Traditional triangulation techniques are the lateration method and the angulation method, also referred to as location measurements by distance selection and angle selection. Lateration is a method of calculating a location by measuring a distance from three or more reference points that know the absolute locations to a corresponding sensor node, i.e., based on a distance between a user and at least one of the three reference points. Angulation is a method of finding a distance by measuring a relative angle from at least one of three reference points.

Lateration-based navigation is used in Global Positioning System (GPS). GPS can use signals measured from satellites to estimate the range between a user and a satellite. Each range measurement estimates the zone of the sphere around the reference point. The intersection of these two spheres defines the position line of the circle and three spheres among intersect at two points only. Therefore, three or more distance measurements are required to achieve one position. The navigation according to an angle is used for commercial and military applications where multiple antenna arrays are used to estimate the angle of introduction. The introduction angle (introduction direction) estimates the angle at which the signal reaches the receiving signal, thereby indicating a location of a mobile station. Then, a position is estimated using a geometric relationship. That is, at least three receivers are required for position measurement in three dimensions.

Wireless Local Area Networks (WLANs) and Cell Towers (cell-towers) may be used instead of GPS for location measurements when GPS signals are not available. The former uses the signal strength of each mobile phone tower to triangulate a position using information on a cell tower position, while the latter uses a provided signal strength of each station to triangulate the position of a radio base station. Both of the two techniques have the disadvantage that they are less accurate than GPS.

Pattern Recognition

In pattern recognition based on location measurement, massive sensor data are obtained from different environmental locations and then combined with a context map. During navigation, a signal recognized by a user device is compared with previously collected sensor data and a location is inferred by an environment-combined map. Other techniques use different sensors.

For example, a camera is sued to secure computer's view and a signal detected through the camera corresponds to an image. While a user explores an environment, a captured image can be compared with an image database of a user location and a known location for computing a location. The disadvantage of this approach is the wide capacity and high computing required for a matching process. Moreover, multiple training steps are required for signal distribution or fingerprint recognition. As a result, a map can be generated by measuring the strength of signals received at different locations and saving them to a database.

During navigation, a received signal strength or distribution over time is measured and compared with the map to find the nearest. For example, Wireless Local Area Networks (WLANs) is an example of a signal distribution location measurement.

Security through public key infrastructure (PKI) based schemas is now widespread. However, the disadvantages of PKI are well known and there are several solutions that are not based on PKI. One of them is an identity-based and certificate-less public key encryption schema.

In the following, the present specification proposes a context-aware ID based encryption solution using a non-PKI-based scheme.

DISCLOSURE OF THE INVENTION

Technical Task

One technical task of one embodiment of the present invention is to provide a security method used in a device and system using ID including context information.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a security device including a camera, a sensing unit, and a controller configured to activate the camera if detecting an object within a preset range through the sensing unit, record an image captured through the activated camera, extract a feature from the recorded image, determine whether the recorded image includes biometric data, and if the recorded image includes the biometric data, determine whether the recorded image includes a pre-recognized object.

If determining that the recorded image includes the pre-recognized object, the controller may compare identification information of the object with a value of pre-calculated identification information.

The identification information of the object may include context information and the controller may determine whether the object is an authenticated object based on the context information.

The controller may periodically update the context information and determine whether the object is the authenticated object based on most recently updated context information.

The context information may be used as an input signal for an ID-based signature or an ID-based signcryption schema.

The context information may include at least one of distance & direction information between the security device and the object, GPS information of the security device, GPS information of the object, environment information within a preset range from the object, and temperature or radioactivity information within a preset range from the object.

The context information may be classified as public or private.

The sensing unit may further include a motion detecting sensor and the controller may determine a motion detected through the motion detecting sensor as one of identification information.

The security device may further include a communication unit. If determining that the image does not include the pre-recognized object, the controller may transmit the image to an external server or device.

If determining that the image does not include the pre-recognized object, the controller may transmit the extracted feature to a cloud.

And, the security may further include a user input unit, and the preset range may be set up by a user.

In another technical aspect of the present invention, provided herein is a method of controlling a security device, the method including detecting an object within a preset range through a sensing unit, activating a camera if detecting the object, recording an image captured through the activated camera, extracting a feature from the recorded image, determining whether the recorded image includes biometric data, and if the recorded image includes the biometric data, determining whether the recorded image includes a pre-recognized object.

Technical solutions obtainable from the present invention may be non-limited by the above mentioned solutions. And, other unmentioned solutions can be clearly understood from the following description by those having ordinary skill in the technical field to which the present invention pertains.

Advantageous Effects

The present can further improve a security level of a security device that uses an ID based signature.

Particularly, if an ID based signature or an ID based signcryption schema using context information of a device and thing as a unique ID, the present invention can provide a user with a security device of a high level.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 5 is a diagram to describe an example that a security device is used for a car according to one embodiment of the present invention.

BEST MODE FOR CARRYING OUT THE INVENTION

Figure 1:
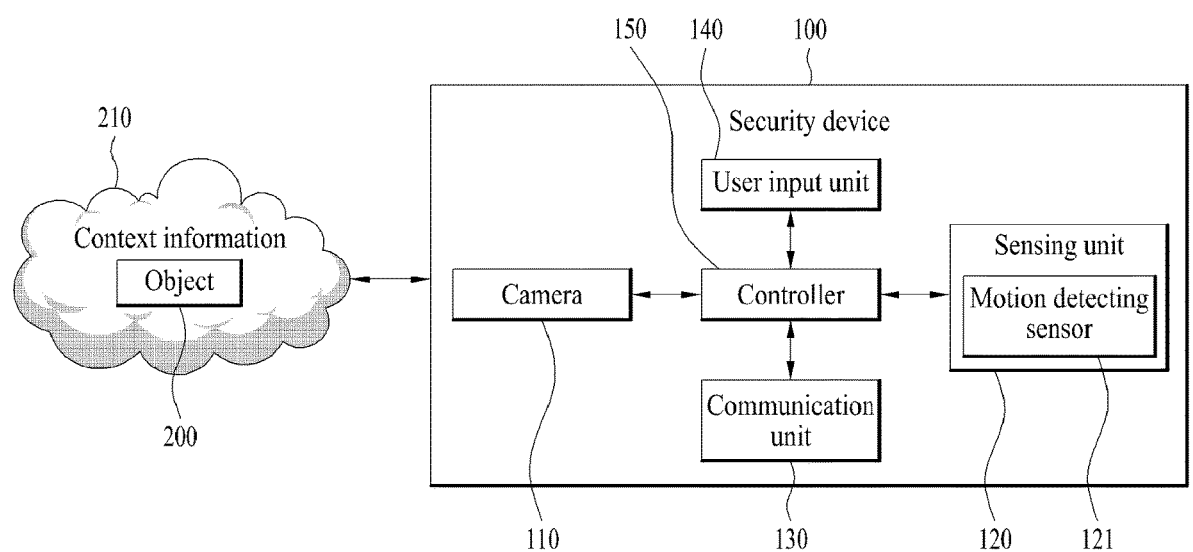
FIG. 1 is a diagram to describe configuration modules of a security device according to one embodiment of the present invention.

Hereinbelow, embodiments of the present disclosure will be described in detail with reference to the accompanying drawings. Irrespective of figure numbers, the same or similar components are denoted by like reference numerals, and a redundant description of the components is avoided. In the following description, postfixes attached to the names of components, "module" and "unit" are assigned or interchangeably used only in consideration of ease of the description, and do not have differentiated meanings or functions. Further, lest it should obscure the subject matter of the embodiments of the present disclosure, a related known technology is not described. In addition, the accompanying drawings are given only to help with the understanding of the embodiments of the present disclosure, not limiting the technical spirit of the present disclosure, and it is to be understood that the disclosure covers all modifications, equivalents, and alternatives falling within the scope and spirit of the disclosure.

Terms including an ordinal number such as first or second may be used to describe various components, not limiting the components. The terms are used only for the purpose of distinguishing one component from another component.

When it is said that a component is "coupled with/to" or "connected to" another component, it should be understood that the one component is connected to the other component directly or through any other component. On the other hand, when it is said that a component is "directly coupled to" or "directly connected to" another component, it may be understood that there is no other component between the components.

Unless the context clearly dictates otherwise, singular forms include plural referents.

In the present disclosure, it is to be understood that the term "include" or "have" signifies the presence of a feature, a number, a step, an operation, a component, or a part, or a combination thereof as described in the disclosure, not excluding the presence or the possibility of addition of one or more other features, numbers, steps, components, or parts, or combinations thereof.

In a security system, a use of Identity (ID) in public key cryptography is very useful. Here, the ID means identification, certification of identity, or identity confirmation, and may correspond to a user identification code for identifying a righteous user in a computer system or a communication network used by a plurality of users. Generally, ID may be limited to a user's ID (e.g., email address) or a device's ID (e.g., device UUID, MAC address, etc.).

Yet, like one embodiment of the present invention, if a context is used as an ID, a new dimension may be added to security. Namely, a binding context having a different ID may widen ID's spectrum.

In the following, for security of a new dimension, an embodiment that various elements (i.e., context information) are included in an ID is described.

Hereinafter, a term 'context' is a term in a broad sense and may include localized information and direction, by which the term is non-limited.

FIG. 1 is a diagram to describe configuration modules of a security device according to one embodiment of the present invention.

Referring to FIG. 1, a security device 100 may include a camera 110, a sensing unit or sensor 120, a communication unit 130, a user input unit 140 and a controller 150.

The camera 110 is a device for processing an image frame of a still image (i.e., image) or a video obtained by an image sensor. The image frame processed by the camera 110 may be saved to a memory within the security device 100 or transmitted externally through the communication unit 130. Two or more cameras 110 may be provided depending on a use environment. According to one embodiment of the present invention, the camera 110 may be activated or deactivated under the control of the controller 150. Particularly, the camera 110 may be activated if an object 200 is detected within a preset range from the security device 100.

The sensing unit 120 may detect a presence or non-presence of proximity of the object 200. To this end, the sensing unit 120 may include a proximity sensor. Here, the proximity sensor means a sensor configured to detect a presence or non-presence of an object approaching a prescribed detection surface or an object existing nearby without a mechanical contact using an electromagnetic field force, infrared rays or the like. For example, the proximity sensors may include a transmissive photoelectric sensor, a direct reflective photoelectric sensor, a mirror reflective photoelectric sensor, a high-frequency oscillation-type proximity sensor, an electrostatic capacity type proximity sensor, a magnetic type proximity sensor, an infrared proximity sensor, and the like.

Further, the sensing unit 120 may include a motion detecting sensor 121. Here, the motion detecting sensor 121 used to detect an illegal activity or motion in an application program actually can simply unify a digital signature with localized information as one of parameters for generating a digital signcryption schema. In doing so, if the localized information of the object 200 moves to a new location, since a newly calculated digital signature and a newly calculated digital encryption schema do not match an original digital signature and an original digital encryption schema, an alarm system can easily detect an illegal activity in a static sensor.

The communication unit 130 can perform communication using various protocols between the security device 100 and other external electric devices/servers and transceive data signals therebetween. According to one embodiment of the present invention, if determining that the object 200 included in an image recorded through the camera 110 does not include a pre-recognized object, the security device 100 can transmit the image to the external electronic device or server trough the communication unit 130. And, the security device 100 cam transmit a configuration extracted from the image to a cloud through the communication unit 130. Moreover, the security device 100 can obtain data for the object 200 not included in the security device 100 through the communication unit 130.

The user input unit 140 generates input data for a user to control an operation of the security device 100. The user input unit 140 may include a keypad, a dome switch, a touchpad (static pressure/electrostatic), a jog wheel, a jog switch and the like. According to one embodiment of the present invention, the user input unit 140 may receive an input of a preset range for recognizing the object 200.

The above-described configurations may transfer obtained data to the controller 150 and operate based on a control command of the controller 150.

The controller 150 processes data, thereby controlling overall operations of the security device 100. According to one embodiment of the present invention, operations performed by the security device 100 can be controlled by the controller 150. Yet, in the drawings and the following description, for clarity, such operations are commonly described as performed/controlled by the security device 100.

Various embodiments described herein may be implemented in a recording medium readable by a computer or a device similar to the computer using software, hardware, or some combination thereof for example.

For hardware implementation, the embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 380.

Figure 2:
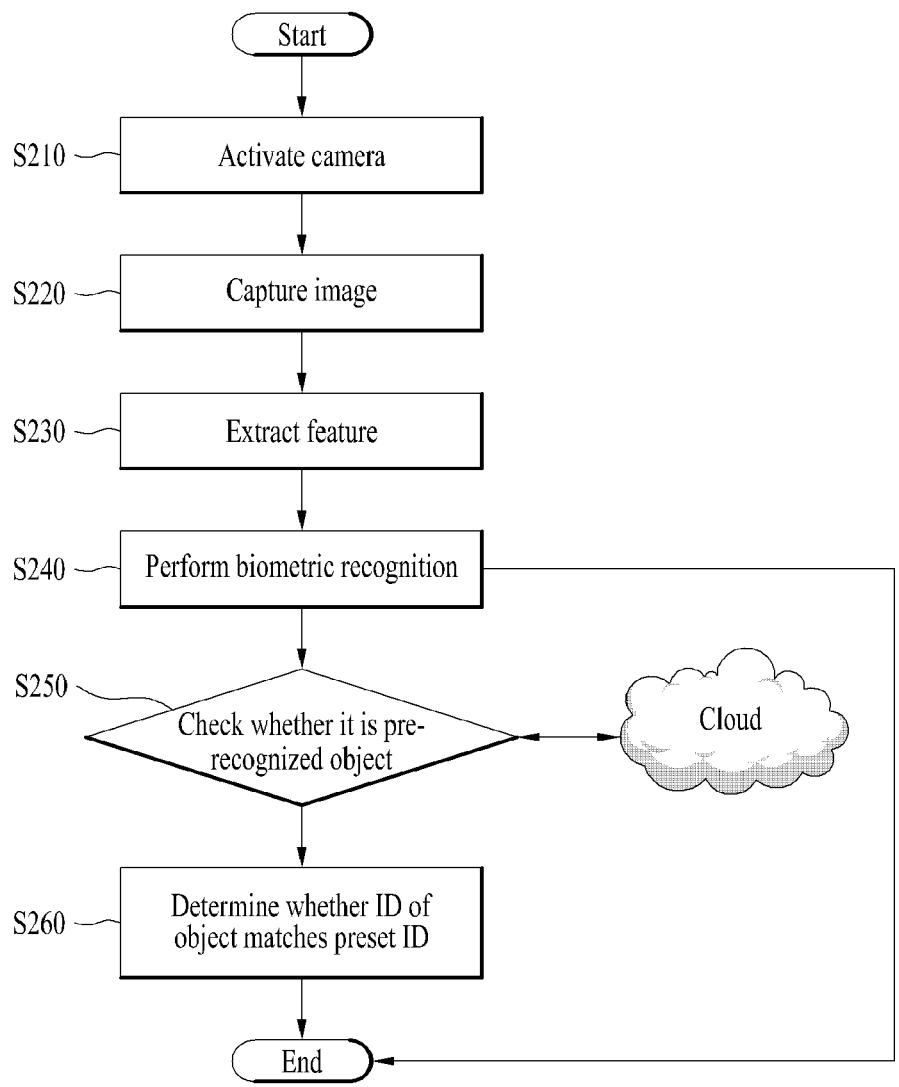
FIG. 2 is a flowchart to describe an example that a smart lock including a security device recognizes an object according to one embodiment of the present invention.
Figure 3:
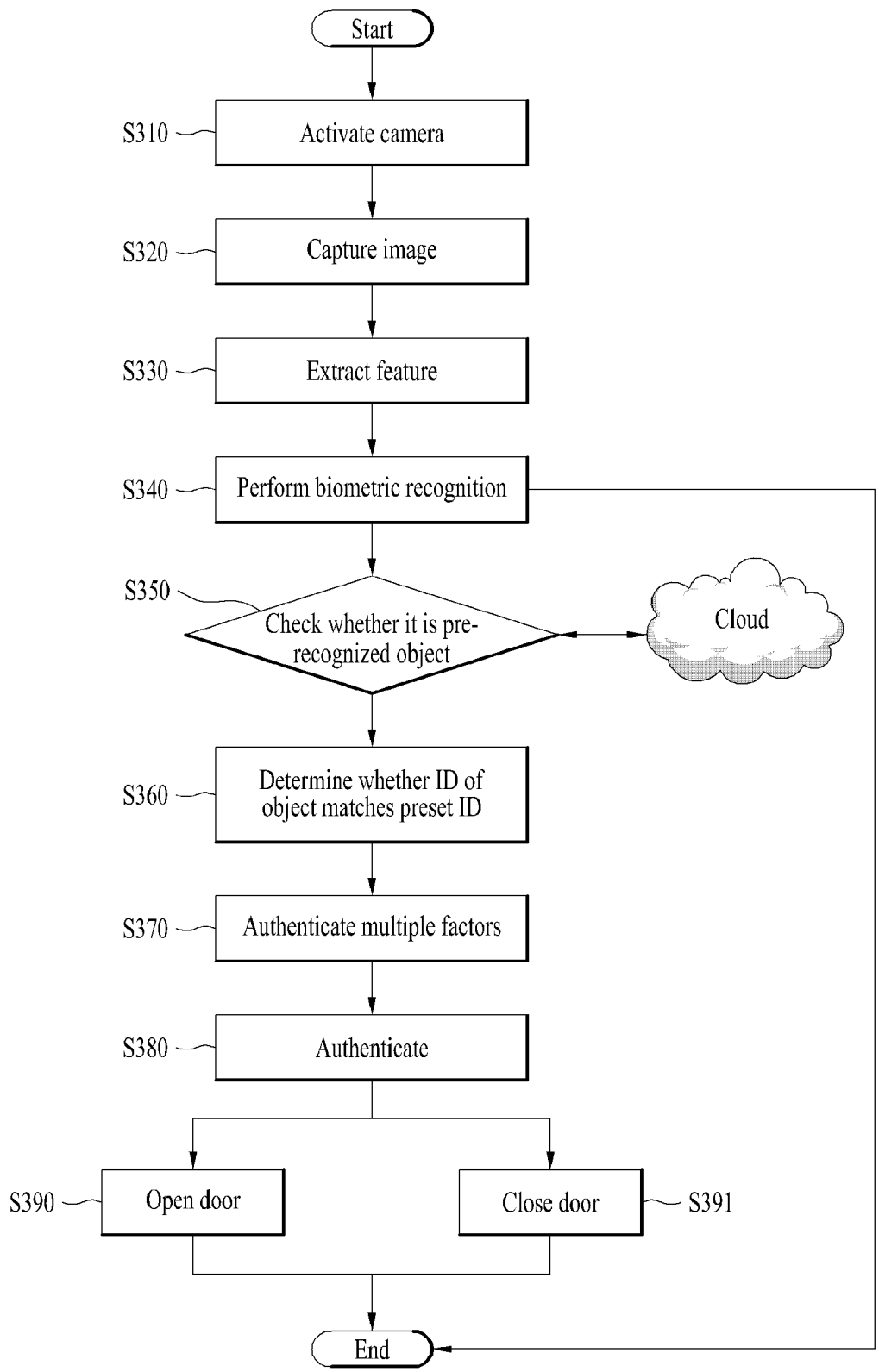
FIG. 3 is a flowchart to describe an example that a smart lock including a security device authenticates multiple factors according to one embodiment of the present invention.
Figure 4:
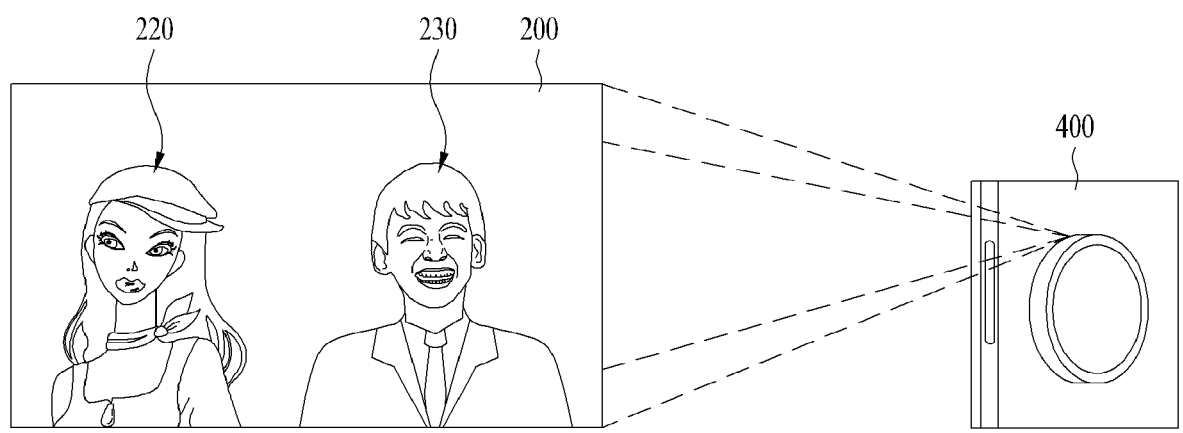
FIG. 4 is a diagram to describe an example that a security device is used for a smart lock according to one embodiment of the present invention.

Various embodiments are described in the following. The respective steps of FIG. 2 and FIG. 3 described in the following can be controlled by the controller. FIGS. 2 to 4 shall be described by taking a smart lock, which includes a security device 100 according to one embodiment of the present invention as an example. Herein, the smart lock may mean a device configured to open/close a door. Hence, the smart lock may include all the configuration modules included in the aforementioned security device 100.

FIG. 2 is a flowchart to describe an example that a smart lock including a security device recognizes an object according to one embodiment of the present invention. In the following, the description redundant with FIG. 1 shall be omitted from the description of the embodiment shown in FIG. 2.

Referring to FIG. 2, in a step S210, a smart lock can activate a camera. Particularly, in case of detecting an object within a preset range, the smart lock can activate the camera. In doing so, a range for the smart lock to detect the object can be set by a user.

In a step S220, the smart lock can capture an image. Particularly, the smart lock can record an image captured through the activated camera. And, the smart lock can record a consecutive video that is not a simple image. Yet, an image shall be taken as an example in the following description.

In a step S230, the smart lock can extract a feature from the recorded image.

In a step S240, the smart lock can perform biometric recognition from the recorded image. Particularly, the smart lock can determine whether the feature detected from the recorded image is a life form. In doing so, the smart lock can determine whether the recorded image includes biometric information (i.e., biometric data). Here, the biometric recognition may be performed to check whether a biometric image is forged. In doing so, if the biometric information is not included in the recorded image, the smart lock can end the flow. Namely, if the recorded image determined as forged, the smart lock may not verify an object.

In a step S250, the smart lock can determine whether the recorded image is a pre-recognized object. Particularly, the smart lock can determine whether the recorded image includes the pre-recognized object.

If the smart lock determines that the recorded image is the pre-recognized object, it can perform a step S260. On the contrary, if the smart lock determines that the recorded image is not the pre-recognized object, the smart lock can safely transmit the extracted feature to the cloud in order to recognize the object. Here, the smart lock can transmit the recorded image to an external server or device so as to recognize the object.

In a step S260, the smart lock may use a legacy authentication based on Transport Layer Security (TLS) schema or a non-authentication-certificate schema that is an ID-based signcryption schema.

According to one embodiment of the present invention, if determining that the recorded image includes the pre-recognized object, the smart lock can compare identification information of the object with a value of pre-calculated identification information. Particularly, in case of the ID-based signcryption schema, if the smart lock determines that the recorded image is the pre-recognized object, the smart lock can compare a Message Authenticated Code (MAC) value of the object with a pre-calculated MAC value.

Thereafter, if the identification information (e.g., MAC value in the above example) is matched, the smart lock can determine that the object is authenticated. Moreover, if the object is authenticated, the smart lock may perform various configured functions. For example, if the object is authenticated, the smart lock can grant an access of a device connected to the smart lock. For another example, if the object is authenticated, the smart lock can open a door connected to the smart lock. This shall be described in detail with reference to FIG. 3 and FIG. 4.

According to one embodiment of the present invention, the identification information of the object may be characterized in including context information. Herein, the smart lock can determine whether the object is an authenticated object based on the context information. This shall be described in detail with reference to FIG. 3.

FIG. 3 is a flowchart to describe an example that a smart lock including a security device authenticates multiple factors according to one embodiment of the present invention. In the following, the description redundant with FIG. 1 or FIG. 2 shall be omitted from the description of the embodiment shown in FIG. 3. Namely, steps S310 to S360 of FIG. 3 can be performed in the same manner of the steps S210 to S260 of FIG. 2.

According to one embodiment of the present invention, a smart lock can propose a multi-factor authentication schema. Namely, in a step S370, the smart lock can use multiple factors as an object authenticating method. Here, the factors may include biometric information (biometric data) and context information. Moreover, all factors may be classified as a portion of an ID-based signature schema. Hence, the smart lock can utilize a plurality of context informations as an object authenticating method.

According to one embodiment of the present invention, context information may become unique background information or an input signal for an ID-based signature schema or an ID-based signcryption schema. Moreover, information collected through cognitive mapping corresponds to unique information and may be used for digital signature and creation of a signcryption system. Hence, a use of context information for security may correspond to a significant factor despite that context information is not included in most of security solutions currently.

According to one embodiment of the present invention, ID including context information may be classified as 'public' or 'private'.

According to one embodiment of the present invention, context information may include at least one of distance & direction information between a smart lock and an object, GPS information of the smart lock, GPS information of the object, environment information within a preset range from the object, and temperature or radioactivity information within a preset range from the object.

For example, if context information is GPS information of an object, a smart lock can use GPS information of a recognized object as a factor for generating an ID-based signcryption schema. For another example, context information may include a temperature or radiation level of a surrounding environment. Particularly, the smart lock may use a temperature or radiation level of a surrounding environment of a recognized object as a factor for generating an attribute or ID based signcryption scheme. This shall be described in detail with reference to FIG. 6.

In a step S380, the smart lock may periodically update context information and determine whether the object is an authenticated object based on the most recently updated context information. If the object is authenticated according to the ID based signcryption schema including the context information in the step S380, a step S390 can be performed. Otherwise, a step S391 can be performed.

In the step S390, as the object is successfully authenticated, the smart lock can open a door connected to the smart lock. Otherwise, in the step S391, as the authentication of the object failed, the smart lock can close the door connected to the smart lock.

Moreover, in the description with reference to FIG. 3, as the authentication of the object is successfully performed, the door connected to the smart lock is opened for example. Yet, an example of granting an access of a device connected to the smart lock owing to the successful authentication of an object is also applicable.

First Embodiment—Smart Lock

FIG. 4 is a diagram to describe an example that a security device is used for a smart lock according to one embodiment of the present invention. In the following, the description redundant with FIGS. 1 to 3 shall be omitted from the description of the embodiment shown in FIG. 2.

Referring to FIG. 4, a smart lock 400 may include a security device 100 of the present invention. According to one embodiment of the present invention, if detecting objects 220 and 230 within a preset range, the smart lock 400 can capture the objects 220 and 230 using a camera.

According to one embodiment of the present invention, the smart lock 400 can extract features from the captured objects 220 and 230. And, the smart lock 400 can determine whether biometric information is included from the captured objects 220 and 230.

In doing so, if the captured objects 220 and 230 are determined as including the biometric information, the smart lock 400 can authenticate the objects 220 and 230 in consideration of context information 200 included in the objects 220 and 230.

According to one embodiment of the present invention, in an IoT area of a consumer, location information of the smart lock 400 can bring unique ID together with the context information 200 of the smart lock 400 and the objects 220 and 230 and the smart lock 400 can use the ID, in which the context information 200 is included, to create digital signature and digital signcryption schemas.

For example, the smart lock 400 creates an ID using at least one of location information of the smart lock 400, direction information of the smart lock 400, location information of a door connected to the smart lock 400, direction information of the door connected to the smart lock 400, location information of the recognized objects 220 and 230, and direction information of the recognized objects 220 and 230 as the context information 200, and then uses the created ID for digital signature and digital signcryption schemas.

Second Embodiment—Context Information for Self-Aware Car

FIG. 5 is a diagram to describe an example that a security device is used for a car according to one embodiment of the present invention. In the following, the description redundant with FIGS. 1 to 4 shall be omitted from the description of the embodiment shown in FIG. 5.

Recently, there has been a need for a self-aware function of a car as a technology for future cars, such as cars with connected cars or autonomous driving vehicles. As a result, the need for a context aware feature is essential, and since recognition of an object's surroundings is not limited to human driving functions, it is essential for the autonomy of devices such as IoT devices or cars. In addition, context recognition can be extended to the recognition of a component (e.g. a malfunction in an ECU or a low tire pressure, etc.).

Referring to FIG. 5, described is an embodiment that a user opens a door of a car using a security device provided in the car. Therefore, a car may include a security device of the present invention. Here, the user may correspond to the aforementioned object. Accordingly, the car including the security device can create identity including context information and use it for digital signature and digital signcryption schemas. Thus, the security device in the car can authenticate a user including user's context information.

Here, context recognition for all components can be mapped to a unique ID that can be used to create the digital signature and digital signcryption schemas. In this case, the digital signature and digital signcryption schemas can be transmitted over networks in the vehicle or through networks connected between vehicles.

Thus, according to one embodiment of the present invention, the security of the automobile industry can be enhanced if context information is mapped to ID and confirmed as an identification factor.

Third Embodiment—Context Information Including Radioactivity Information

Figure 6:
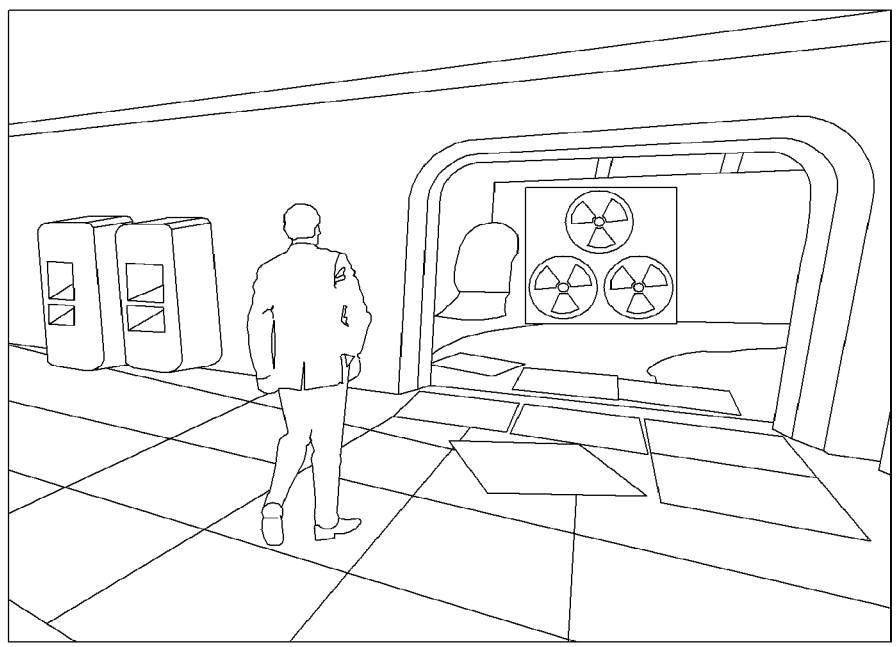
FIG. 6 is a diagram to describe an example that a security device is used for a danger space according to one embodiment of the present invention.

FIG. 6 is a diagram to describe an example that a security device is used for a danger space according to one embodiment of the present invention. In the following, the description redundant with FIGS. 1 to 5 shall be omitted from the description of the embodiment shown in FIG. 6.

Referring to FIG. 6, when a user intends to enter a danger space, a security device stops it. Such an embodiment is described in the following. Hence, a door for identifying a danger space may include a security device and a user may correspond to the aforementioned object. Hence, the door including the security device can create an ID including context information of user's surroundings and use it for digital signature and digital signcryption schemas.

For example, in places where values of temperature or radioactivity levels are important, such as nuclear power plants, if the temperature or level of radioactivity at the place exceeds a threshold, the consequences can be fatal to a user. Therefore, the security device can continuously monitor the status of critical parameters (e.g. temperature or radiation) and may not open the door despite that other factors are appropriate for user's safety if the detected temperature or radiation level is equal to or higher than a preset level.

Moreover, although the drawings are separately described for clarity of description, it is possible to design and implement a new embodiment by merging embodiments described and illustrated in the respective drawings.

Furthermore, a security device and controlling method thereof may be configured in a manner of selectively combining the respective embodiments entirely or in part so that various modifications can be achieved, instead of limitedly applying the configurations and methods of the above-described embodiments.

The present invention mentioned in the foregoing description can be implemented in a program recorded medium as computer-readable codes. The computer-readable media may include all kinds of recording devices in which data readable by a computer system are stored. The computer-readable media may include HDD (Hard Disk Drive), SSD (Solid State Disk), SDD (Silicon Disk Drive), ROM, RAM, CD-ROM, magnetic tapes, floppy discs, optical data storage devices, and the like for example and also include carrier-wave type implementations (e.g., transmission via Internet). Further, the computer may include the controller 150 of the terminal.

The foregoing embodiments are merely exemplary and are not to be considered as limiting the present disclosure. Thus, it is intended that the present invention covers the modifications and variations of this invention that come within the scope of the appended claims and their equivalents.

INDUSTRIAL APPLICABILITY

The present invention has industrial applicability in a security device and is repeatedly applicable.

What is claimed is:

1. A security device, comprising:
   a context information intake device;
   a sensor; and
   a controller configured to:
      activate the context information intake device when the sensor detects an activation event initiated by an object such that the context information intake device records context information associated with the object; and
      perform a context-aware cryptographic process to cryptographically authenticate the object using attribute-based access control based on the recorded context information associated with the object;
      wherein the attribute-based access control comprises an attribute based signcryption scheme;
      wherein the context information is used as a factor in generating the attribute based signcryption scheme.

2. The security device of claim 1, wherein the context-aware cryptographic process comprises an ID-based cryptographic process in which the ID includes the recorded context information.

3. The security device of claim 1, wherein the context information intake device comprises at least one of a camera, a laser scanner, a radar, and a sonar.

4. The security device of claim 1, wherein the context information comprises a recorded image.

5. The security device of claim 4, further comprising a communication unit, wherein the controller is further configured to cause the communication unit to transmit the recorded image to an external server or device when the recorded image does not include any pre-recognized object.

6. The security device of claim 1, wherein the context information comprises at least one of distance and direction information between the security device and the object, Global Positioning System (GPS) information of the security device, GPS information of the object, environment information within a preset range from the object, or temperature or radioactivity information within a preset range from the object.

7. The security device of claim 1, wherein the controller is further configured to:
   periodically update the context information; and
   authenticate the object based on most recently updated context information.

8. The security device of claim 1, wherein the context information is classified as public or private.

9. The security device of claim 1, wherein at least a portion of the context information is obtained using the sensor of the security device.

10. A method for controlling a security device, the method comprising
- detecting, by a sensor, an activation event initiated by an object;
- activating a context information intake device when the sensor detects the activation event;
- recording, by the activated context information intake device, context information associated with the object; and
- performing a context-aware cryptographic process to cryptographically authenticate the object using attribute-based access control based on the recorded context information associated with the object;
- wherein the attribute-based access control comprises an attribute based signcryption scheme;
- wherein the context information is used as a factor in generating the attribute based signcryption scheme.

11. The method of claim 10, wherein the context-aware cryptographic process comprises an ID-based cryptographic process in which the ID includes the recorded context information.

12. The method of claim 10, wherein the context information intake device comprises at least one of a camera, a laser scanner, a radar, and a sonar.

13. The method of claim 10, wherein the context information comprises a recorded image.

14. The method of claim 13, further comprising transmitting the recorded image to an external server or device when the recorded image does not include any pre-recognized object.

15. The method of claim 10, wherein the context-aware cryptographic process comprises comparing a Message Authenticated code (MAC) value associated with the object with a pre-calculated value.

16. The method of claim 10, wherein the context information comprises at least one of distance and direction information between the security device and the object, Global Positioning System (GPS) information of the security device, GPS information of the object, environment information within a preset range from the object, or temperature or radioactivity information within a preset range from the object.

17. The method of claim 10, further comprising:
- periodically updating the context information; and
- authenticating the object based on most recently updated context information.

18. The method of claim 10, wherein the context information is classified as public or private.

* * * * *